(12) United States Patent
Ding et al.

(10) Patent No.: US 10,200,774 B1
(45) Date of Patent: Feb. 5, 2019

(54) SENSOR CORD CONSTRUCTION TO PREVENT CAPACITANCE VARIATION

(71) Applicant: Google LLC, Mountain View, CA (US)

(72) Inventors: Yao Ding, Mountain View, CA (US); Jianyi Liu, Mountain View, CA (US); Yuxin Yang, Mountain View, CA (US); David Sparks, Mountain View, CA (US); Nidhi Rathi, Mountain View, CA (US); Chi Kin Benjamin Leung, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/827,045

(22) Filed: Nov. 30, 2017

Related U.S. Application Data

(60) Provisional application No. 62/428,465, filed on Nov. 30, 2016.

(51) Int. Cl.
*H04R 1/10* (2006.01)
*G01V 3/08* (2006.01)

(52) U.S. Cl.
CPC ............. *H04R 1/1041* (2013.01); *G01V 3/08* (2013.01); *H04R 1/1016* (2013.01); *H04R 1/1033* (2013.01)

(58) Field of Classification Search
CPC .. H04R 1/1041; H04R 1/1016; H04R 1/1033; G01V 3/08
See application file for complete search history.

(56) References Cited

U.S. PATENT DOCUMENTS

| | | | |
|---|---|---|---|
| 3,717,833 A * | 2/1973 | Kubota | H01F 19/00 336/69 |
| 9,838,811 B2 * | 12/2017 | Pelosi | H04R 1/1008 |
| 2012/0043107 A1 * | 2/2012 | Nair | H01B 7/0876 174/103 |
| 2014/0016803 A1 * | 1/2014 | Puskarich | H04R 1/1041 381/309 |
| 2014/0146976 A1 * | 5/2014 | Rundle | H04R 1/1083 381/71.6 |
| 2018/0039086 A1 * | 2/2018 | Jiang | H04R 1/10 |

* cited by examiner

*Primary Examiner* — Mohammad Islam
(74) *Attorney, Agent, or Firm* — Colby Nipper (57) ABSTRACT

A sensor cord construction to prevent capacitance variation is described herein. A sensor may be connected to a controller via a cord that includes a first cable and a second cable. The first cable includes first shield wires that are twisted around the first cable in a first direction, and the second cable includes second shield wires that are twisted around the second cable in a second direction that is opposite the first direction. When the cord is twisted, one of the first or second cables may provide a positive capacitance variation, while the other of the first or second cables may provide a negative capacitance variation in an amount that is directly proportional to the positive capacitance variation. Thus, the controller detects a minimum capacitance variation, when the cord is twisted, due to the capacitance variation of the first cable and the second cable canceling each other out.

20 Claims, 5 Drawing Sheets

SENSOR CORD CONSTRUCTION TO PREVENT CAPACITANCE VARIATION

BACKGROUND

Conventionally, a cable for carrying a sensitive signal, such as a capacitive touch signal is protected by a shield. However, conventional shields are undesirable because they are generally rigid and inflexible, while also being expensive to manufacture.

SUMMARY

A sensor cord construction to prevent capacitance variation is described herein. A sensor (e.g., a capacitance sensor) may be connected to a controller via a cord that includes a first cable and a second cable. The first cable includes first shield wires that are twisted around the first cable in a first direction, and the second cable includes second shield wires that are twisted around the second cable in a second direction that is opposite the first direction. When the cord is twisted, one of the first cable or the second cable may provide a positive capacitance variation, while the other of the first cable or the second cable may provide a negative capacitance variation in an amount that is directly proportional to the positive capacitance variation. As a result, the controller detects a minimum capacitance variation, when the cord is twisted, due to the capacitance variation of the first cable and the second cable canceling each other out.

This summary is provided to introduce simplified concepts concerning a sensor cord construction to prevent capacitance variation, which is further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and devices a sensor cord construction to prevent capacitance variation are described with reference to the following drawings. The same numbers are used throughout the drawings to reference like features and components.

DETAILED DESCRIPTION

Overview

A sensor cord construction to prevent capacitance variation is described herein. In various implementations, a sensor, such as a capacitance sensor, may be connected to a controller via a sensor cord ("cord"). For example, a capacitance sensor pad may be implemented at one or both ear pieces of a headset (e.g., ear buds or headphones), and attached to the controller via the cord of the headset. The controller may be a separate hardware piece that is positioned on the cord itself (e.g., on a hardware pendant), or the controller may be implemented at a separate device. For example, the cord of a headset may include a plug (e.g., audio jack) that plugs into a smartphone, tablet, or laptop.

The sensor may be utilized to detect whether the headset is placed on the user's head. For example, when the headset is placed on the user's head, the contact of the sensor pad with the user's body (e.g., the user's head and/or ears), causes the sensor to detect an increase in capacitance. A sensor signal, indicative of the increase in capacitance, is then transmitted through the cord to the controller. The controller detects the increase in capacitance, and in response, determines that the headset is on the user's head. A variety of different functions may then be triggered by the controller, based on this determination, such as powering on the headset, activating noise canceling functionality for the headset, or automatically starting playback of audio to the headset, to name just a few.

Conventionally, a cord for a headset includes a cable (e.g., a signal wire) that is protected by a cover or shield. However, conventional shields or covers are undesirable because they are generally rigid and inflexible, while also being expensive to manufacture. In order to reduce the cost of manufacturing, a cable for the cord may be shielded using one or more shield wires that are twisted or rotated around the cable. This type of shield is easy to manufacture, and is relatively inexpensive. Furthermore, constructing the shield with a wire increases the flexibility of the cord compared to conventional shields. However, when the shield is constructed using a wire, twisting of the cord causes a proximity between the cable and shield wires to change. This change in proximity between the cable and shield wires causes the controller to sense an increase in capacitance if the twist follows the same direction as the direction in which the shield wires are wound around the cable. If, however, the twist follows an opposite direction to the direction in which the shield wires are wound around the cable, the change in proximity between the cable and shield wires causes the controller to sense a decrease in capacitance. Thus, this variation in capacitance caused by twisting of the cord creates a faulty signal that may cause the controller to incorrectly determine that the headset is on the user's head.

Cable capacitance variation may have a linear relationship to the degree of twist when the twist is minor and may not cause permanent deformation of the wires. Thus, in accordance with various implementations, a sensor cord is constructed with a first cable and a second cable. The first cable includes first shield wires that are twisted around the first cable in a first direction, and the second cable includes second shield wires that are twisted around the second cable in a second direction that is opposite the first direction. The terminals of the first cable and the second cable may be coupled together to create a combined signal that is measured by the controller. Alternately, the first cable and the second cable may be directly coupled to the controller. When the cord is twisted, both the first cable and the second cable may also be twisted. However, because the first shield wires and the second shield wires are twisted in opposite directions, one of the first cable or the second cable may provide a positive capacitance variation, while the other of the first cable or the second cable may provide a negative capacitance variation in an amount that is directly proportional to the positive capacitance variation. This results in a minimum capacitance variation because the capacitance signals of the first cable and the second cable cancel each other out. As such, this cord construction enables a low cost, flexible cord with improved capacitance stability in the cord when it is twisted.

Example Environment

Figure 1:
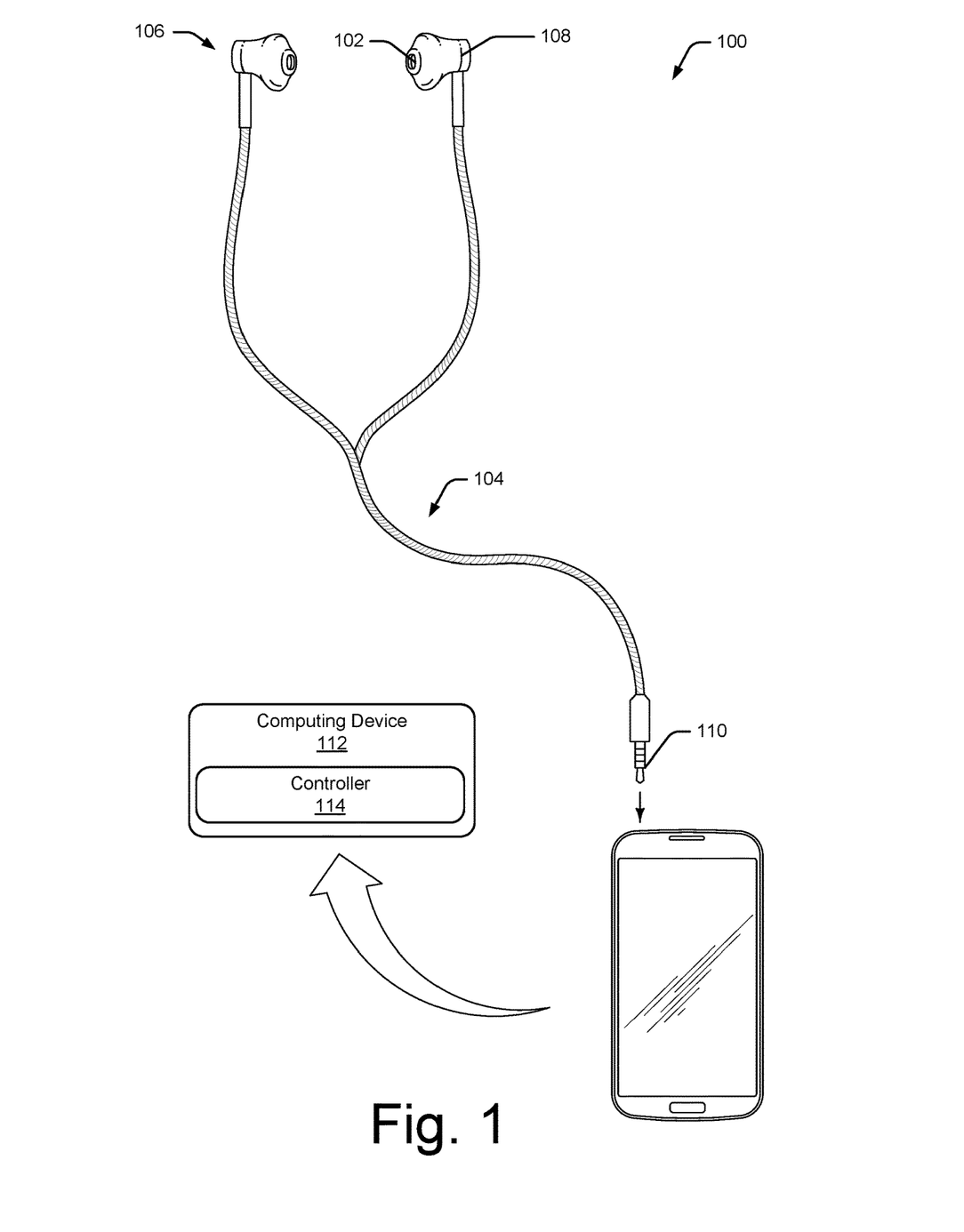
FIG. 1 is an illustration of an example environment in which a sensor cord construction to prevent capacitance variation may be implemented.

FIG. 1 is an illustration of an example environment 100 in which a sensor cord construction to prevent capacitance variation may be implemented. Environment 100 includes a sensor 102 and a sensor cord 104 ("cord 104"). In this example, cord 104 is illustrated as a cord for a headset 106, and is configured to communicate audio data to headset 106 to output audio via speakers of the headset 106. In other implementations, however, cord 104 can be implemented to transfer power, data, and so forth. For example, while cord 104 is described herein as a cable or cord for a headset, such as earbuds or headphones, it is to be noted that cord 104 may be utilized for various different types of uses, such as cables for appliances (e.g., lamps or fans), USB cords, SATA cords, data transfer cords, power cords, or any other type of cable or cord that is used to transfer data or media.

In this example, sensor 102 is implemented as a capacitance sensor pad that is positioned on one or both ear pieces 108 of the headset 106. The capacitance sensor 102 may be utilized to detect when the headset 106 is placed on the user's head. To do so, the capacitance sensor 102 includes a conductive layer. When the headset 106 is placed on the user's head, the capacitance sensor 102, positioned on one or both of the ear pieces 108, makes contact with or is positioned in close proximity to the user's ear and/or head. The close proximity of the user's body to the conductive layer of the capacitive sensor 102 causes the capacitance to increase. This increase is capacitance is detectable to determine that the headset 106 is on the user's head.

In environment 100, cord 104 further includes a connector 110 (e.g., an audio jack) that is configured to be plugged into a computing device 112. Computing device 112 is illustrated here as a mobile phone, but may also be configured as a desktop computer, a laptop computer, a tablet device, a wearable device, and so forth. Thus, computing device 112 may range from full resource devices with substantial memory and processor resources (e.g., personal computers, game consoles) to low-resource devices with limited memory and/or processing resources (e.g., mobile devices).

Computing device 112 is illustrated as including a controller 114 that is configured to detect input to sensor 102 via signals transmitted through cord 104. For example, when the headset 106 is placed on the user's head, the capacitive sensor detects an increase in capacitance, as described above. Sensor signals, indicative of the increase in capacitance, are transmitted through the cord 104 to the controller 114. Controller 114 includes sensing circuitry that detects this increase in capacitance. Then, based on the increase in capacitance, controller 114 can determine that the headset 106 is positioned on the user's head. In response to this determination, controller 114 can trigger a variety of different functions, such as powering on the headset 106, activating noise canceling functionality of the headset 106, or automatically starting playback of audio to the headset 106, to name just a few. In addition, controller 114 is representative of functionality to control headset 106, such as to play audio to headset 106, pause audio, skip to new audio, adjust the volume of audio, and so forth. In FIG. 1, controller 114 is illustrated as being implemented at computing device 112. However, in alternate implementations, controller 114 may be integrated within cord 104, or implemented with another device, such as powered headphones, a lamp, a clock, white goods (e.g., a refrigerator with a sensor on a moving door), and so forth.

Having discussed an example environment 100 in which cord 104 may be implemented, consider now a detailed discussion of a ways in which cord 104 may be constructed to prevent capacitance variation in the sensor signal transmitted via cord 104 to controller 114.

Figure 2:
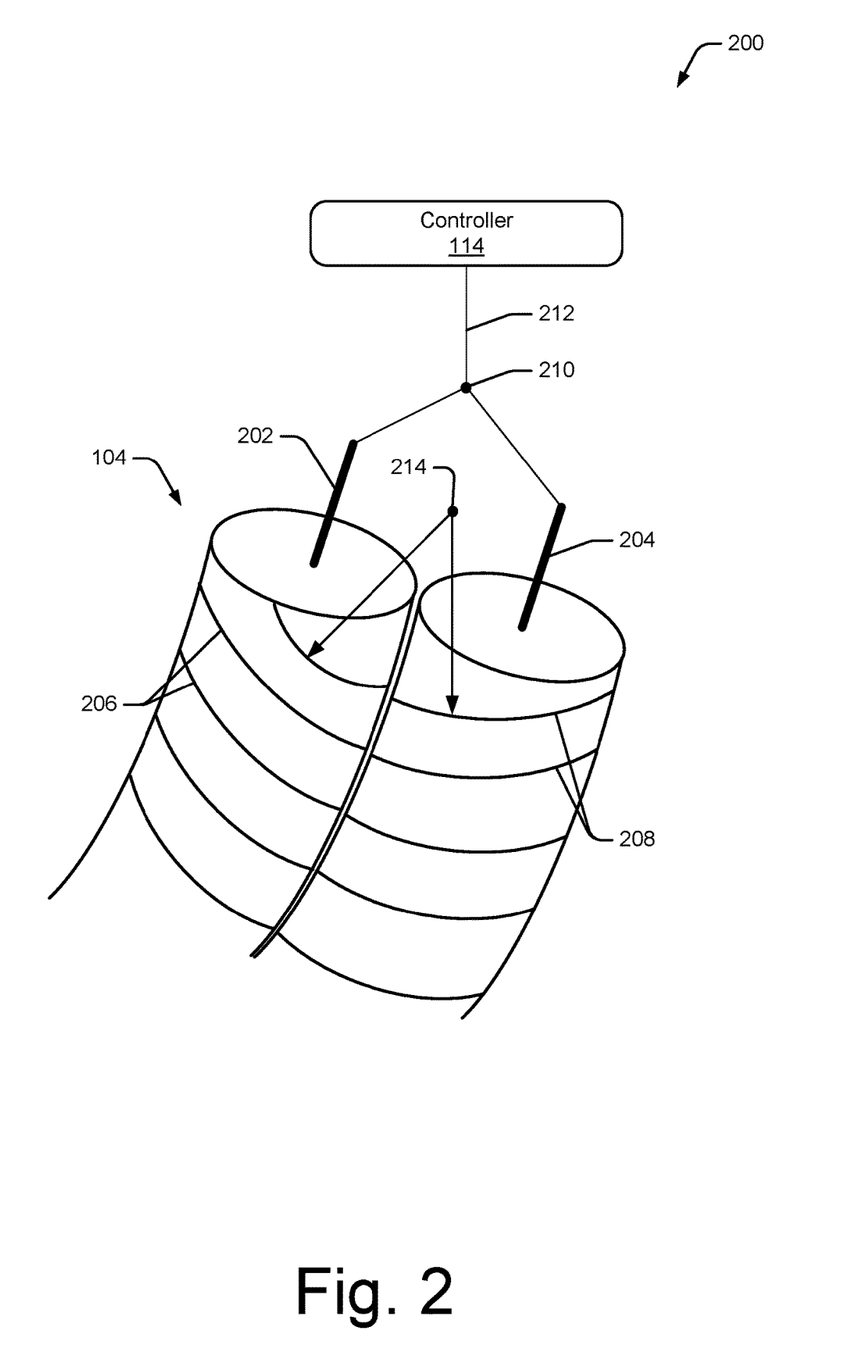
FIG. 2 illustrates an example of a construction of a cord to prevent capacitance variation in accordance with one or more implementations.

FIG. 2 illustrates an example 200 of a construction of cord 104 to prevent capacitance variation in accordance with one or more implementations. In this example, internal contents of cord 104 are shown to include a first cable 202 and a second cable 204. First cable 202 includes first shield wires 206 that are twisted around the first cable 202 in a first direction (clockwise in this example), and second cable 204 includes second shield wires 208 that are twisted around the second cable 204 in a second direction (counter-clockwise in this example) that is opposite the first direction. The first cable 202 and second cable 204 may run parallel the length of cord 104. In this example, the terminals of the first cable 202 and the second cable 204 are tied together at 210 to generate a combined signal 212 that is detectable by controller 114. The first shield wires 206 and second shield wires 208 may also be tied together at 214. Alternately, the first cable 202 and second cable 204 may be separately coupled to controller 114.

The first shield wires 206 and second shield wires 208 can be formed from a flexible material such as enamel wires on 38 gauge, although other types of thin, flexible wires may also be utilized. In one or more implementations, the first shield wires 206 and second shield wires 208 include a conductive wire that is combined with one or more flexible threads. The conductive wire may be combined with flexible threads in a variety of different ways, such as by twisting the flexible threads with the conductive wire, wrapping the flexible threads with the conductive wire, braiding or weaving the flexible threads to form a cover that covers the conductive wire, and so forth. The conductive wire may be implemented using a variety of different conductive materials, such as copper, silver, gold, or aluminum. The flexible thread may be implemented as any type of flexible thread or fiber, such as cotton, wool, silk, nylon, polyester, and so forth. Combining the conductive wire with flexible threads causes the first shield wires 206 and second shield wires 208 to be flexible and stretchable.

Notably, constructing cord 104 in this way, prevents capacitance variation when the cord is twisted. Such twisting may occur as the result of intentional twisting of the cord 104 by the user (e.g., twisting of the cord either clockwise or counter-clockwise), or unintentionally as the cord may become twisted during normal use. For example, when the sensor 102 makes contact with the human body (e.g., when the headset 106 is placed on the user's head), controller 114 detects an increase in the capacitance measured on the first cable 202 and the second cable 204. However, when the user twists the cord 104, both the first cable 202 and second cable 204 are also twisted. Because the first shield wires 206 and second shield wires 208 are twisted in opposite directions, the capacitance of either the first cable 202 or second cable 204 may increase, while the capacitance of the other of the first cable 202 or second cable 204 may decrease. This change in capacitance is substantially linear. As a result, the combined signal 212 detected by controller 114 may provide minimum capacitance variation due to the twist signal cancellation generated by constructing the cord to include first shield wires 206 of first cable 202 twisted in an opposite direction as the twist of the second shield wires 208 of second cable 204.

For example, twisting the cord 104 in the same direction as the second direction of the twist of the second shield wires 208, causes the second shield wires 208 to tighten, which causes a distance between the second shield wires 208 and the second cable 204 to decrease. This decrease in distance between the second shield wires 208 and the second cable 204 causes an increase in capacitance for the second cable 204. However, twisting the cord 104 in the same direction as the second shield wires 208 means that the twist is in the opposite direction as the twist of the first shield wires 206. Thus, twisting the cord 104 in the same direction as the second direction of the second shield wires 208 causes the first shield wires 206 to loosen, which causes a distance between the first shield wires 206 and the first cable 202 to increase. This increase in distance between the first shield wires 206 and the first cable 202 causes a decrease in capacitance for the first cable 202.

The increase in capacitance between the second cable 204 and second shield wires 208, and the decrease in capacitance between the first cable 202 and first shield wires 206, are substantially linear to the degree of twist. Thus, the capacitance variation rate is substantially identical for the absolute value in the first cable 202 and the second cable 204, but with opposite polarity. Thus, the increase in capacitance of the second cable 204 effectively cancels out the decrease in capacitance of the first cable 202. As such, a capacitance value of the combined signal 212, which is measured by controller 114, is essentially negligible.

Similarly, twisting the cord 104 in the opposite direction as the second direction of the twist of the second shield wires 208, causes the second shield wires 208 to loosen, which causes the distance between the second shield wires 208 and second cable 204 to increase. This increase in distance between the second shield wires 208 and second cable 204 causes a decrease in capacitance for the second cable 204. However, twisting the cord 104 in the opposite direction as the second shield wires 208 means that the twist is in the same direction as the twist of the first shield wires 206. Thus, twisting the cord 104 in the opposite direction as the second direction of the second shield wires 208 causes the first shield wires 206 to tighten, which causes the distance between the first shield wires 206 and the first cable 202 to decrease. This decrease in distance between the first shield wires 206 and the first cable 202 causes an increase in capacitance for the first cable 202.

The decrease in capacitance between the second cable 204 and second shield wires 208, and the increase in capacitance between the first cable 202 and first shield wires 206, are substantially linear to the degree of twist. Thus, the capacitance variation rate is substantially identical for the absolute value in the first cable 202 and the second cable 204, but with opposite polarity. Thus, the decrease in capacitance of the second cable 204 effectively cancels out the increase in capacitance of the first cable 202. As such, a capacitance value of the combined signal 212, which is measured by controller 114, is essentially negligible.

Figure 3:
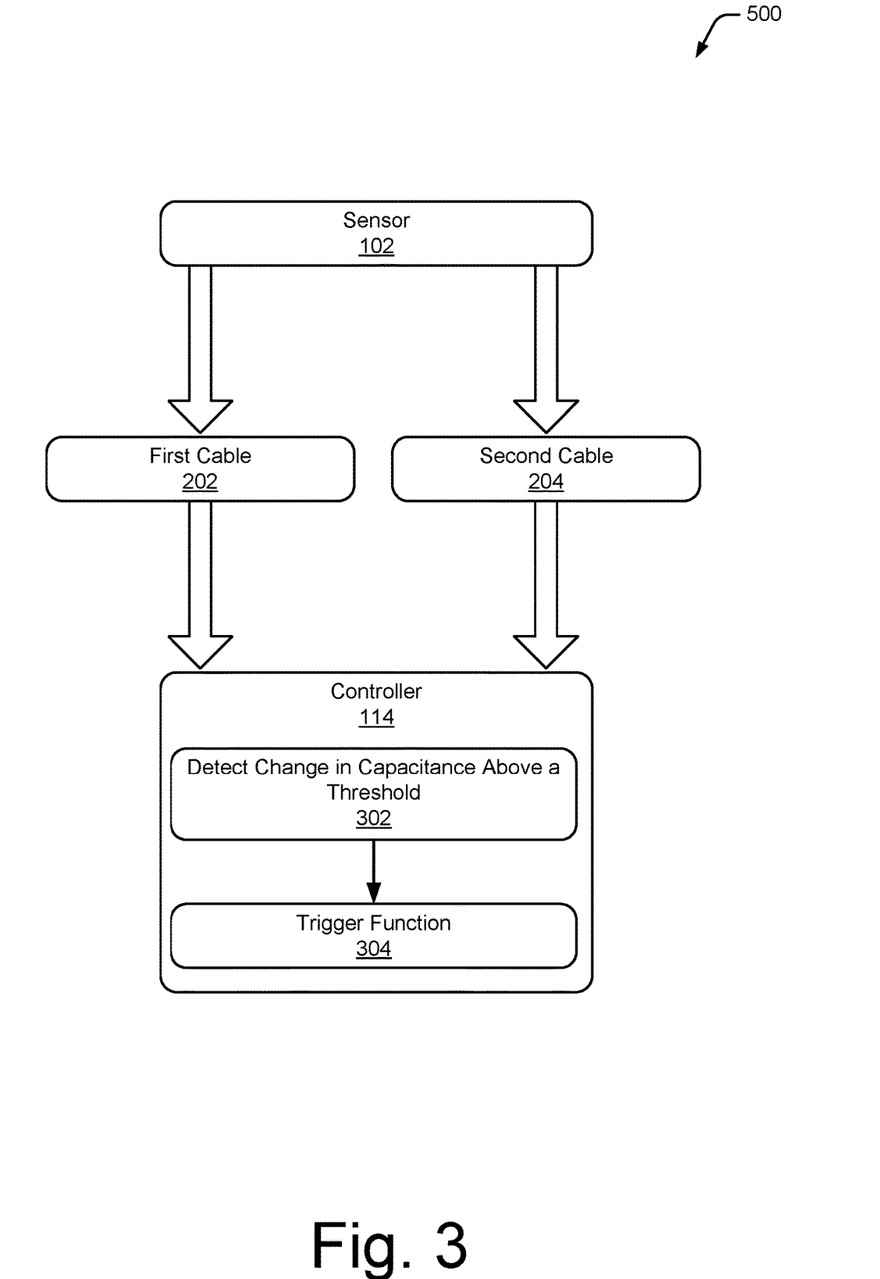
FIG. 3 illustrates an example system in which a controller coupled to a sensor via a cord detects input to the sensor in accordance with various implementations.

FIG. 3 illustrates an example system 300 in which a controller coupled to a sensor via a cord detects input to the sensor in accordance with various implementations. In this example, controller 114 monitors capacitance values on a first cable 202 and a second cable 204. As discussed throughout, controller 114 can be implemented to monitor a combined signal of the first cable 202 and the second cable 204. Alternately, controller 114 can separately monitor capacitance signals on the first cable 202 and second cable 204.

When the user twists the cord 104, controller 114 detects an insignificant capacitance change, if any. For example, controller 114 can compare the capacitance variation of the combined signal 212 to a threshold. Minor capacitance variation, caused by twisting of the cord 104, is well below the threshold. As such, twisting the cord 104, without input to the sensor 102, may result in an insignificant capacitance change, and thus controller 114 does not falsely attribute twisting of the cord 104 as input to the sensor 102.

However, in response to input to the sensor 102 (e.g., when the user places headset 106 on their head), controller 114 detects a change in capacitance that is above the threshold at 302. Detection of the change in capacitance being above the threshold indicates that input has been provided to sensor 102. Thus, in response to detecting a change in capacitance above the threshold, controller 114 triggers a function at 304. The function may be associated with the sensor input. For example, in the case of capacitance sensors placed on ear pieces 108 of headset 106, controller 114 may trigger functions such as powering on the headset, activating noise canceling functionality for the headset, or automatically starting playback of audio to the headset, to name just a few.

Notably, if the user twists the cord 104 while also providing input to the sensor 102, the twisting may have an insignificant effect on the capacitance of the combined signal 212 detected by the controller 114. For example, in the case of a capacitance sensor 102 on ear pieces 108 of headset 106, the value of the change in capacitance corresponding to the sensor 102 coming into contact with a human body may be an order of magnitude greater than the value of the capacitance change caused by twisting of the cord 104. As such, twisting the cord 104 may have a negligible effect on the capacitance value measured by the controller 114.

Example Method

Figure 4:
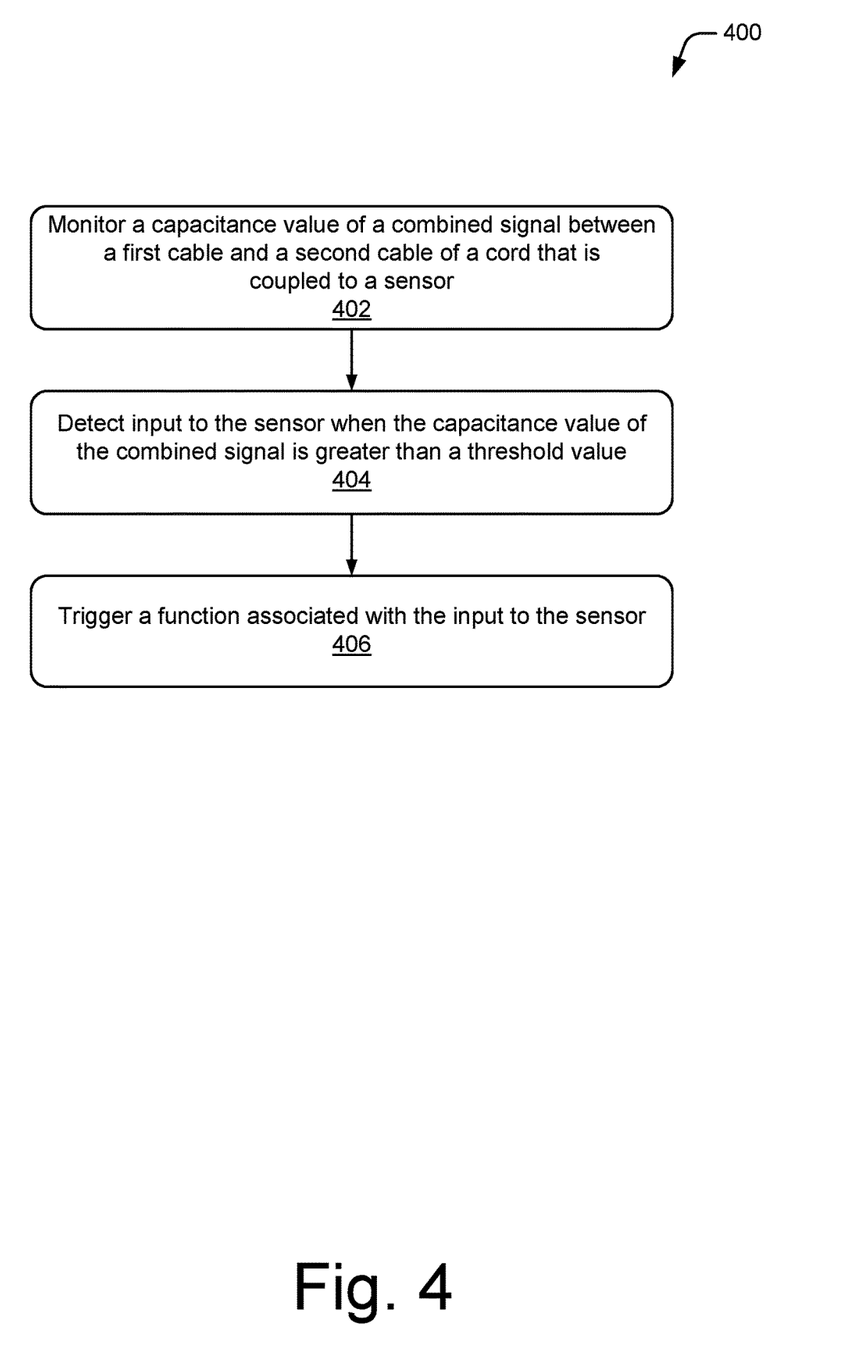
FIG. 4 illustrates an example method of preventing capacitance variation when detecting input to a sensor via a cord.

FIG. 4 illustrates an example method 400 of preventing capacitance variation when detecting input to a sensor via a cord. This method is shown as a set of blocks that specify operations performed but are not necessarily limited to the order or combinations shown for performing the operations by the respective blocks. The techniques are not limited to performance by one entity or multiple entities operating on one device.

At 402, a capacitance value of a combined signal between a first cable and a second cable of a cord that is coupled to a sensor is monitored. For example, controller 114 monitors a capacitance value of a combined signal 212 between first cable 202 and second cable 204 of cord 104 that is coupled to sensor 102. As shown in FIG. 2, cord 104 is constructed with first cable 202 and second cable 204. First cable 202 includes first shield wires 206 twisted around the first cable 202 in a first direction, and second cable 204 includes second shield wires 208 twisted around the second cable 204 in a second direction that is opposite the first direction.

At 404, input to the sensor is detected when the capacitance value of the combined signal is greater than a threshold value. For example, controller 114 detects input to sensor 102 when the capacitance value of the combined signal 212 increases above a threshold value. Notably, when the user twists the cord 104, controller 114 detects an insignificant capacitance change, if any, which is well below the threshold value. Thus, controller 114 does not falsely attribute twisting of cord 104 as input to sensor 102.

At 406, in response to detecting input to the sensor, a function associated with the input to the sensor is triggered. For example, controller 114 triggers a function associated with input to the sensor 102. In the case of a headset 106, such functions may include powering on the headset, activating noise canceling functionality for the headset, or automatically starting playback of audio to the headset, to name just a few.

Example Computing System

Figure 5:
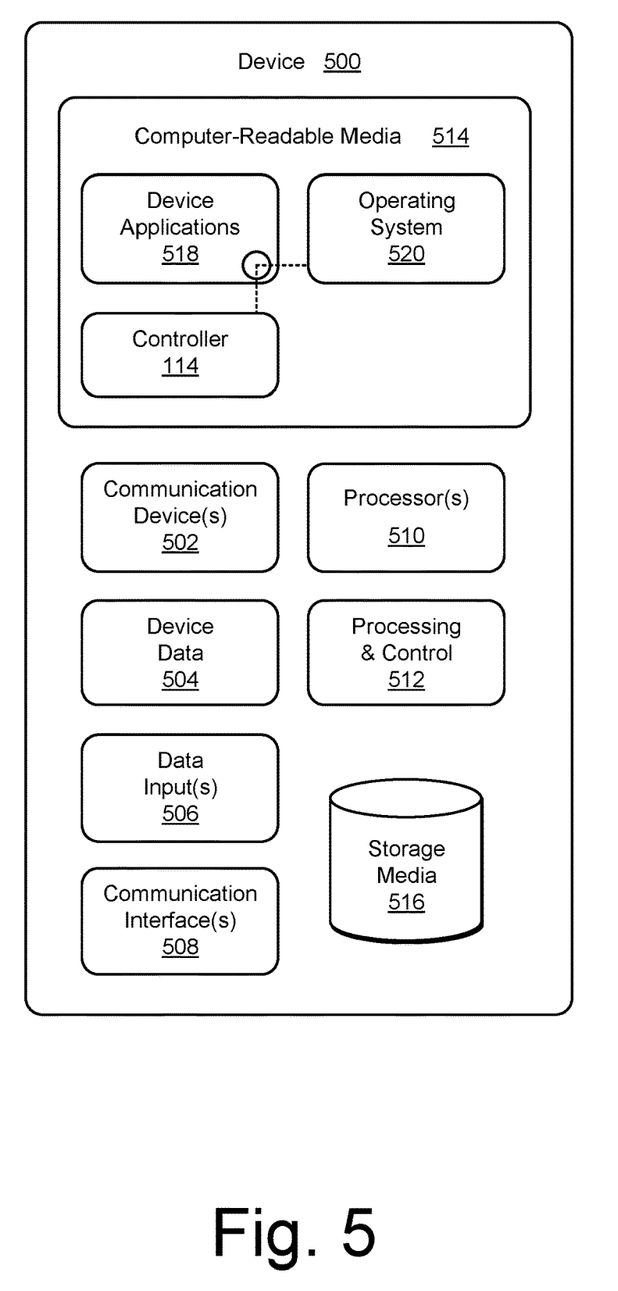
FIG. 5 illustrates various components of an example computing system that can be implemented as any type of client, server, and/or computing device as described with reference to the previous FIGS. 1-4 to implement a sensor cord construction to prevent capacitance variation.

FIG. 5 illustrates various components of an example computing system 500 that can be implemented as any type of client, server, and/or computing device as described with reference to the previous FIGS. 1-4 to implement a sensor cord construction to prevent capacitance variation. In embodiments, computing system 500 can be implemented as one or a combination of a wired and/or wireless wearable device, System-on-Chip (SoC), and/or as another type of device or portion thereof computing system 500 may also be associated with a user (e.g., a person) and/or an entity that operates the device such that a device describes logical devices that include users, software, firmware, and/or a combination of devices.

Computing system 500 includes communication devices 502 that enable wired and/or wireless communication of device data 504 (e.g., received data, data that is being received, data scheduled for broadcast, data packets of the data, etc.). Device data 504 or other device content can include configuration settings of the device, media content stored on the device, and/or information associated with a user of the device. Media content stored on computing system 500 can include any type of audio, video, and/or image data. Computing system 500 includes one or more data inputs 506 via which any type of data, media content, and/or inputs can be received, such as human utterances, user-selectable inputs (explicit or implicit), messages, music, television media content, recorded video content, and any other type of audio, video, and/or image data received from any content and/or data source.

Computing system 500 also includes communication interfaces 508, which can be implemented as any one or more of a serial and/or parallel interface, a wireless interface, any type of network interface, a modem, and as any other type of communication interface. Communication interfaces 508 provide a connection and/or communication links between computing system 500 and a communication network by which other electronic, computing, and communication devices communicate data with computing system 500.

Computing system 500 includes one or more processors 510 (e.g., any of microprocessors, controllers, and the like), which process various computer-executable instructions to control the operation of computing system 500 and to enable techniques for, or in which can be embodied, a sensor cord construction to prevent capacitance variation. Alternatively or in addition, computing system 500 can be implemented with any one or combination of hardware, firmware, or fixed logic circuitry that is implemented in connection with processing and control circuits which are generally identified at 512. Although not shown, computing system 500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Computing system 500 also includes computer-readable media 514, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Computing system 500 can also include a mass storage media device 516.

Computer-readable media 514 provides data storage mechanisms to store device data 504, as well as various device applications 518 and any other types of information and/or data related to operational aspects of computing system 500. For example, an operating system 520 can be maintained as a computer application with computer-readable media 514 and executed on processors 510. Device applications 518 may include a device manager, such as any form of a control application, software application, signal-processing and control module, code that is native to a particular device, a hardware abstraction layer for a particular device, and so on.

Device applications 518 also include any system components, engines, or managers to implement a sensor cord construction to prevent capacitance variation. In this example, device applications 518 include controller 114.

CONCLUSION

Although embodiments of a sensor cord construction to prevent capacitance variation have been described in language specific to features and/or methods, it is to be understood that the subject of the appended claims is not necessarily limited to the specific features or methods described. Rather, the specific features and methods are disclosed as example implementations of sensor cord construction to prevent capacitance variation.

What is claimed is:

1. A headset comprising:
   a capacitance sensor positioned on one or both ear pieces of the headset;
   a cord configured to couple the capacitance sensor to a controller, the cord comprising:
      a first cable comprising first shield wires that are twisted around the first cable in a first direction; and
      a second cable comprising second shield wires that are twisted around the second cable in a second direction that is opposite the first direction effective to cancel out a capacitance change in the first cable caused by a user twisting the cord and prevent the controller from falsely attributing the twisting as input to the capacitance sensor; and
   the controller configured to monitor a combined signal from both the first cable and the second cable for a capacitance value of the capacitance sensor, and detect that the headset is placed on the user's head in response to the capacitance value being greater than a threshold value.

2. The headset of claim 1, wherein construction of the cord with the first cable comprising first shield wires that are twisted around the first cable in the first direction and the second cable comprising second shield wires that are twisted around the second cable in the second direction that is opposite the first direction prevents variation in the capacitance value when the cord is twisted by the user.

3. The headset of claim 1, wherein, responsive to the cord being twisted in a same direction as the second direction of the twist of the second shield wires:
- the first shield wires loosen, which causes a first distance between the first shield wires and the first cable to increase and a first capacitance for the first cable to decrease; and
- the second shield wires tighten, which causes a second distance between the second shield wires and the second cable to decrease and a second capacitance for the second cable to increase.

4. The headset of claim 3, wherein the increase in second capacitance of the second cable cancels out the decrease in the first capacitance of the first cable.

5. The headset of claim 1, wherein responsive to the cord being twisted in an opposite direction as the second direction of the twist of the second shield wires:
- the first shield wires tighten, which causes a first distance between the first shield wires and the first cable to decrease and a first capacitance for the first cable to increase; and
- the second shield wires loosen, which causes a second distance between the second shield wires and the second cable to increase and a second capacitance for the second cable to decrease.

6. The headset of claim 5, wherein the decrease in capacitance of the second cable cancels out the increase in capacitance of the first cable.

7. The headset of claim 1, wherein the controller is further configured to trigger a function in response to a detection that the headset is placed on the user's head.

8. The headset of claim 1, wherein the first shield wires and the second shield wires comprise enamel wires.

9. The headset of claim 1, wherein the first shield wires and the second shield wires each comprise a conductive wire combined with one or more flexible threads.

10. The headset of claim 1, wherein the controller is implemented on the cord.

11. The headset of claim 1, wherein the controller is implemented at a computing device coupled to the cord.

12. A system comprising:
- a cord comprising:
  - a first cable comprising first shield wires that are twisted around the first cable in a first direction; and
  - a second cable comprising second shield wires that are twisted around the second cable in a second direction that is opposite the first direction to cancel out capacitance changes in the first cable caused by the cord being twisted by a user and prevent the capacitance changes caused by the cord being twisted by the user from being falsely attributed as user input;
- a sensor coupled to the cord; and
- a controller communicatively coupled to the sensor via the cord, the controller configured to detect input to the sensor via signals transmitted through the first cable and the second cable of the cord.

13. The system of claim 12, wherein the sensor comprises a capacitance sensor, and wherein the controller is configured to monitor a capacitance value of the capacitance sensor and detect input to the capacitance sensor in response to the capacitance value being greater than a threshold value.

14. The system of claim 13, wherein the first shield wires that are twisted around the first cable in the first direction and the second shield wires that are twisted around the second cable in the second direction that is opposite the first direction prevents variation in the capacitance value when the cord is twisted by the user.

15. The system of claim 13, wherein, responsive to the cord being twisted in a same direction as the second direction of the twist of the second shield wires:
- the first shield wires loosen, which causes a first distance between the first shield wires and the first cable to increase and a first capacitance for the first cable to decrease; and
- the second shield wires tighten, which causes a second distance between the second shield wires and the second cable to decrease and a second capacitance for the second cable to increase.

16. The system of claim 15, wherein the increase in capacitance of the second cable cancels out the decrease in capacitance of the first cable.

17. The system of claim 13, wherein, responsive to the cord being twisted in an opposite direction as the second direction of the twist of the second shield wires:
- the first shield wires tighten, which causes a first distance between the first shield wires and the first cable to decrease and a first capacitance for the first cable to increase; and
- the second shield wires loosen, which causes a second distance between the second shield wires and the second cable to increase and a second capacitance for the second cable to decrease.

18. The system of claim 17, wherein the decrease in capacitance of the second cable cancels out the increase in capacitance of the first cable.

19. The system of claim 12, wherein the controller is implemented on the cord.

20. The system of claim 12, wherein the controller is implemented at a computing device coupled to the cord.

* * * * *